Patented Apr. 1, 1947

2,418,289

UNITED STATES PATENT OFFICE 2,418,289

MANUFACTURE OF CYCLIC BASES DERIVED FROM ARYLACETONITRILE DERIVATIVES

Franz Bergel, Nathan Chadwick Hindley, Alexander Lang Morrison, and Heinrich Rinderknecht, Welwyn Garden City, England, assignors, by mesne assignments, to Hoffmann-La Roche Inc., Roche Park, Nutley, N. J., a corporation of New Jersey No Drawing. Original application March 4, 1942, Serial No. 433,430. Divided and this application January 3, 1944, Serial No. 516,842. In Great Britain August 12, 1941

6 Claims. (Cl. 260—294)

This invention relates to the manufacture of cyclic bases derived from arylacetonitrile derivatives. It is known that by the condensation of ethylene chlorhydrin with benzyl cyanide α-(β'-hydroxy-ethyl)-α-phenylacetonitrile is formed. This latter compound on treatment with thionyl chloride gives the corresponding α-(β'-chloroethyl)-α-phenylacetonitrile (cf. Knowles and Cloke, J. American Chemical Society, 1932, 54, 2028).

The introduction of two β-halogenalkyl groups into arylacetonitriles has hitherto not been carried out.

According to the present invention α:α-bis-(β'-halogenalkyl)-arylacetonitriles of the following general formula

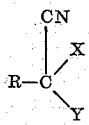

where R is an aryl group, which may carry substituents not interfering with the reaction, and X and Y are β-halogenalkyl groups, are readily prepared. These compounds are transformed into cyclic bases such as piperidine derivatives by condensation with primary amines, subsequent to which the basic nitriles so formed may be converted into the corresponding acids and derivatives thereof.

According to the process of this invention in the manufacture of 4-arylpiperidine-4-nitrile derivatives the aforesaid α:α-bis-(β'-halogenalkyl)-arylacetonitriles are manufactured by condensing an arylacetonitrile in which the reactive methylene group is free, such as benzyl cyanide, with slightly more than two molecular proportions of a β-halogenalkylvinyl ether, such as β-chloroethylvinyl ether, in the presence of an alkali metal or an alkali metal compound, such as sodium or sodamide, capable of forming an alkali derivative of the arylacetonitrile. The resulting product is an α:α-bis-(β'-vinvyloxyalkyl)-arylacetonitrile, which on mild hydrolysis with an acid reagent splits off the vinyl groups as acetaldehyde and gives the corresponding α:α-bis-(β'-hydroxyalkyl)-arylacetonitrile. Treatment of the latter compound with any halogenating agent capable of replacing a hydroxyl group with a halogen but which will not hydrolyses a nitrile group gives the α:α-bis-(β'-halogenalkyl)-arylacetonitrile. When this latter compound is treated with a primary amine it yields a 4-arylpiperidine-4-nitrile derivative, which on hydrolyses with acidic reagents readily yields the corresponding 4-arylpiperidine-4-carboxylic acid. Derivatives of the acid such as esters, amides, etc., are formed in known manner.

We are aware that British specification No. 501,135 describes the manufacture of piperidine-4-nitrile compounds by condensing an arylacetonitrile having a free methylene group in the presence of an agent capable of eliminating hydrogen halides with certain tertiary amines containing β-halogenalkyl groups.

The following examples illustrate how the process of the present invention may be carried into effect:

1. To a mixture of 17.5 parts by weight of β-chloroethyl-vinyl ether, 9.6 parts by weight of benzyl cyanide and 100 parts by volume of dry toluene, 6.5 parts by weight of powdered sodamide are added in several portions. The reaction mixture is stirred mechanically and the temperature kept between 30° and 40° C. by gradual addition of the sodamide.

When all the sodamide has been added, the reaction mixture is slowly heated to the boiling point and refluxing continued for 1½ hours. After cooling, water is added and the toluene layer separated. The aqueous part is extracted with ether. The combined ether-toluene extracts are then washed with water, dried over anhydrous sodium sulphate and evaporated. The residue is distilled in high vacuo. It boils at 135–140° C./0.2 mm. and is α:α-bis-(β'-vinyloxyethyl)-α-phenylacetonitrile.

Eight parts by weight of α:α-bis-(β'-vinyloxyethyl)-α-phenylacetonitrile are added to 60 parts by volume of water at 80° C. with vigorous shaking. 2 parts by volume of concentrated hydrochloric acid (d=1.18) are then added and shaking continued for 10 minutes at 80–90° C. After cooling, the mixture is extracted several times with ether. The combined ether extracts are dried over anhydrous sodium sulphate and evaporated. The residue is recrystallised from a mixture of benzene and petroleum ether (boiling point 60°–80° C.), or from water, and the α:α-bis-(β'-hydroxyethyl)-α-phenyl-acetonitrile is obtained in the form of colourless crystals. It melts at 96–98° C.

Six parts by weight of α:α-bis-(β'-hydroxyethyl)-α-phenyl-acetonitrile are dissolved in 12 parts by weight of diethylaniline. The mixture is cooled to 0° C. and 12 parts by weight of thionyl chloride are added slowly with stirring. When all has been added the mixture is heated on the water-bath for 45 minutes. After cooling, the dark oily mass is poured on a mixture of ice and dilute hydrochloric acid. After standing for 15 minutes, the pale brown solid which has separated is extracted with ether. The ether extract is washed with dilute sodium bicarbonate solution and subsequently with water and is dried over anhydrous sodium sulphate. After evaporation of the ether, the residue is recrystallised from petrol ether (boiling point 40–80° C.). The α:α-bis-(β'-chloroethyl)-α-phenyl-acetonitrile separates in colourless crystals which melt at 52–54° C.

4.8 parts by weight of α:α-bis-(β'-chloroethyl)-α-phenyl-acetonitrile are heated with a solution of 2.5 parts by weight of methylamine in 15 parts by volume of absolute alcohol in a sealed tube at 100–115° C. for 6 hours. The contents of the tube are then washed out with alcohol. The alcohol is evaporated in vacuo and the residue taken up in dilute hydrochloric acid. After extraction with ether for the removal of non-basic material, the aqueous part is made alkaline with sodium hydroxide and extracted with ether. The extract is washed with water and dried over anhydrous sodium sulphate. After evaporation of the ether, the residue is distilled in high vacuo. The 1-methyl-4-phenylpiperidine-4-nitrile obtained boils at 126°C./0.2 mm.

7.5 parts by weight of 1-methyl-4-phenylpiperidine-4-nitrile are heated with 30 parts by volume of concentrated hydrochloric acid (d=1.18) in a pressure bottle at 130° C. for 5 hours. After cooling, the contents of the flask are made alkaline with 4 normal caustic soda. The caustic soda solution after extraction with ether to remove unchanged nitrile is neutralised with dilute hydrochloric acid, when 1-methyl-4-phenylpiperidine-4-carboxylic acid crystallises out, melting point 308° C. If desired, this acid can be transformed into the corresponding ester by treating it with alcoholic hydrochloric acid in the usual manner. The ethyl 1-methyl-4-phenylpiperidine-4-carboxylate is a liquid boiling at 143° C./1.5 mm. and forms a hydrochloride, melting point 188° C.

2. To a well stirred solution of 11 parts by weight of o-methylbenzyl cyanide and 39 parts by weight of β-chloroethyl-vinyl ether in 80 parts by volume of dry toluene are added 10 parts by weight of powdered sodamide in small portions, so that the temperature is mantained between 30° and 40° C. When all the sodamide has been added the reaction mixture is heated to the boiling point and allowed to reflux for 2 hours. On working up the reaction mixture exactly as described in Example 1 α:α-bis-(β'-vinyloxyethyl)-α-(o-tolyl)-acetonitrile is isolated as an oil which boils at 135–140° C. at 0·02 mm.

7 parts by weight of α:α-bis-(β'-vinyloxyethyl)-α-(o-tolyl)-acetonitrile are added with vigorous stirring to 57 parts by weight of water heated to 90° C. 1.7 parts by volume of concentrated hydrochloric acid are then added and stirring and heating continued for 10 minutes. On cooling a solid separates which after recrystallisation from benzene melts at 101° C. and is α:α-bis-(β'-hydroxyethyl)-α-(o-tolyl)-acetonitrile.

To a mixture of 8 parts by weight of α:α-bis-(β'-hydroxyethyl)-α-(o-tolyl)-acetonitrile and 16 parts by weight of diethylaniline cooled to 0° C. are added slowly with stirring 16 parts by weight of thionyl chloride. The mixture is stirred for a further 30 minutes at 0° C. and then heated on the boiling water bath for a further 45 minutes. The reaction mixture is then treated with excess ice-cold hydrochloric acid and extracted well with ether. The residue left after drying and evaporating the ethereal extract is an oil and distils at 145–150° at 0.1 mm. to give α:α-bis-(β'-chloroethyl)-α-(o-tolyl)-acetonitrile.

When condensed with methylamine exactly as described in Example 1, α:α-bis-(β'-chloroethyl)-α-(o-tolyl)-acetonitrile yields 1-methyl-4-(o-tolyl)-piperidine-4-nitrile, the hydrochloride of which has melting point 280–285° C.

Hydrolysis of the above nitrile by heating with concentrated hydrochloric acid at 130° C. for several hours yields 1-methyl-4-(o-tolyl)-piperidine-4-carboxylic acid, melting point 305–310° C., the ethylester of which is an oil which boils at 175° C. at 11 mm. pressure.

This application is a divisional application divided out of application Serial No. 433,340, filed March 4, 1942, Patent No. 2,398,575.

We claim:

1. A process for the manufacture of 4-aryl-piperidine-4-nitrile derivatives which comprises heating an α:α-bis-(β'-halogenalkyl)-arylacetonitrile with a primary amine.

2. A process for the manufacture of 4-aryl-piperidine-4-carboxylic acids which comprises heating an α:α-bis-(β'-halogenalkyl)-arylacetonitrile with a primary amine and hydrolyzing the product with an acidic reagent.

3. A process of making 1-methyl-4-(o-tolyl)-piperidine-4-carboxylic acid, which comprises heating α:α-bis-(β'-chloroethyl)-α-(o-tolyl)-acetonitrile with methylamine, which yields 1-methyl-4-(o-tolyl)-piperidine-4-nitrile, and hydrolyzing the latter into 1-methyl-4-(o-tolyl)-piperidine-4-carboxylic acid.

4. A process for the manufacture of 4-aryl-piperidine-4-nitrile derivatives which comprises heating α:α-bis-(β'-chloroethyl)-α-(o-tolyl)-acetonitrile with a primary amine.

5. A process for the manufacture of 1-methyl-4-phenylpiperidine-4-nitrile which comprises heating α:α-bis-(β'-chloroethyl)-α-phenyl acetonitrile with methylamine.

6. A process for the manufacture of 1-methyl-4-(o-tolyl)-piperidine-4-nitrile which comprises heating α:α-bis-(β'-chloroethyl)-α-(o-tolyl)-acetonitrile with methylamine.

FRANZ BERGEL.
NATHAN CHADWICK HINDLEY.
ALEXANDER LANG MORRISON.
HEINRICH RINDERKNECHT.

REFERENCES CITED

The following references are of record in the file of this patent:

UNITED STATES PATENTS

| Number | Name | Date |
| --- | --- | --- |
| 2,167,351 | Eisleb | July 25, 1939 |

OTHER REFERENCES

Beilstein, 4th edition, vol. 9, page 525.

Certificate of Correction

Patent No. 2,418,289. April 1, 1947.

FRANZ BERGEL ET AL.

It is hereby certified that errors appear in the above numbered patent requiring correction as follows: In the heading to the printed specification, line 12, for "Serial No. 433,430" read *Serial No. 433,340*; column 3, line 30, for "is vacuo" read *in vacuo*; column 4, line 44, claim 3, after the word "and" strike out the syllable and hyphen "hy-"; and that the said Letters Patent should be read with these corrections therein that the same may conform to the record of the case in the Patent Office.

Signed and sealed this 10th day of June, A. D. 1947.

[SEAL]

LESLIE FRAZER,
*First Assistant Commissioner of Patents.*